(12) United States Patent
Hoffmann et al.

(10) Patent No.: US 10,634,117 B2
(45) Date of Patent: Apr. 28, 2020

(54) METHOD FOR CONTROLLING A WIND TURBINE WITH ACCESS HATCH INTERLOCKS, AND ASSOCIATED WIND TURBINE

(71) Applicant: General Electric Company, Schenectady, NY (US)

(72) Inventors: Till Hoffmann, Osnabrueck (DE); Andreas Schubert, Ostercappeln (DE); Frank Hinken, Rheine (DE); Hartmut Andreas Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 15/676,062

(22) Filed: Aug. 14, 2017

(65) Prior Publication Data
US 2019/0048851 A1  Feb. 14, 2019

(51) Int. Cl.
*F03D 7/02* (2006.01)
*F03D 7/04* (2006.01)
*F03D 80/50* (2016.01)
*F03D 17/00* (2016.01)

(52) U.S. Cl.
CPC .......... *F03D 7/0264* (2013.01); *F03D 7/042* (2013.01); *F03D 17/00* (2016.05); *F03D 80/50* (2016.05); *F05B 2260/30* (2013.01); *F05B 2270/107* (2013.01); *F05B 2270/404* (2013.01); *F05B 2270/80* (2013.01)

(58) Field of Classification Search
CPC ........ F03D 17/00; F03D 7/0264; F03D 7/042; F03D 80/50; F05B 2260/30; F05B 2270/107; F05B 2270/404; F05B 2270/80
See application file for complete search history.

(56) References Cited

U.S. PATENT DOCUMENTS

| 8,169,097 B2 | 5/2012 | Weitkamp |
| 9,157,557 B2 | 10/2015 | Geiken |
| 2010/0013227 A1* | 1/2010 | Weitkamp ............. F03D 7/0264 290/44 |
| 2010/0183440 A1* | 7/2010 | Von Mutius .......... F03D 7/0264 416/1 |
| 2010/0232978 A1 | 9/2010 | Nielsen et al. |

* cited by examiner

*Primary Examiner* — Jacob M Amick
*Assistant Examiner* — Ruben Picon-Feliciano
(74) *Attorney, Agent, or Firm* — Dority & Manning, P.A.

(57) ABSTRACT

A method for protecting personnel working in a wind turbine nacelle or hub includes monitoring a nacelle roof hatch and a hub access hatch, each hatch having a switch configured therewith. When at least one of the hatches is detected as opened, a control system detects if a rotor lock has been engaged. If the rotor lock has not been engaged, the control system triggers a rotor brake to stop rotor and drivetrain component rotational movement and actuates a first control lockout between the respective switch configured with the open hatch and the rotor brake. The control system also initiates a control lockout that prevents release of the rotor brake until the switch indicates that the open hatch has been closed and the first control lockout has been reset.

11 Claims, 3 Drawing Sheets

METHOD FOR CONTROLLING A WIND TURBINE WITH ACCESS HATCH INTERLOCKS, AND ASSOCIATED WIND TURBINE

FIELD OF THE INVENTION

The present disclosure relates generally to wind turbines, and more particularly to a method for implementing safety protocols related to access area hatches in the wind turbine nacelle.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The uptower components of the wind turbines require periodic maintenance, inspection, and repair, and the safety of personnel conducting such procedures is paramount. The rotating components of the rotor, drivetrain, and yaw system all present risks to personnel, and it is an important safety consideration to prevent the rotation of such components while personnel are performing certain procedures in the nacelle or rotor hub. In various jurisdictions around the world, permits for installation and operation of wind turbines require interlocks between the rotor and yaw systems with the hatches in the nacelle that give access to the respective components/systems.

In this regard, U.S. Patent Publication No. 2010/0232978 describes a locking arrangement for locking a hub of a wind turbine against rotational movements relative to a base frame of the nacelle of the wind turbine. Such a locking arrangement is, e.g., required for safety purposes in order to prevent the hub from rotating during maintenance of the wind turbine. The locking arrangement may include a safety system that prevents access to an interior part of the hub when certain components of the locking arrangement are in the release position. The safety system may, e.g., be coupled to a locking system of a hatch or a door arranged across an opening creating access to the hub, wherein the safety system prevents the locking system from being unlocked if the locking components are in the release position, i.e. if the hub is allowed to rotate relative to the base frame. Thereby it is ensured that maintenance personnel can only gain access to the interior part of the hub if the hub is securely locked to the base frame.

Accordingly, there is an ongoing need for improved safety systems and procedures related to controlling access to areas of the nacelle and rotor hub when rotating components present a risk to personnel.

BRIEF DESCRIPTION OF THE INVENTION

Aspects and advantages of the invention will be set forth in part in the following description, or may be obvious from the description, or may be learned through practice of the invention.

In one aspect, the present invention is directed to a method for protecting personnel working in a wind turbine nacelle or hub, the method including monitoring a plurality of hatches within the nacelle with a monitoring device for personnel or material ingress and egress. The hatches may include, for example, the nacelle roof hatch and the hub access hatch. When at least one of the hatches is detected as opened, the method includes detecting if a rotor lock has been engaged. If the rotor lock has not been engaged, then a rotor brake is triggered to stop any further rotor and drivetrain component rotational movement. Also, the method includes actuating a first control lockout between the monitoring device configured with the respective open hatch and the rotor brake. This first control lockout prevents release of the rotor brake until the monitoring device associated with the open hatch indicates that the hatch has been closed and the first control lockout has been reset.

The monitoring devices may be switches that detect an open or closed state of the hatches. In certain embodiments, the first and second monitoring devices are monitored to detect when one of the hatches has been opened. The monitoring devices may be switches, such as mechanical, or mechanical/electrical contact switches configured on the hatches. In alternate embodiments, any manner of sensor or switch (such as an optical sensor) may be used to detect if one of the hatches is open, wherein such sensors are configured in communication with the lockout control system.

The first control lockout may be actuated by a control system that is in communication with the various monitoring devices or switches, a rotor lock sensor (or suitable indicator), rotor brake controller, and a reset functionality. This control system may be integrated with the overall wind turbine controller, or may be a separate control system in communication with the wind turbine controller.

In a particular embodiment, the method requires that the first control lockout be manually reset at a location within the nacelle that may be remote from the hatch. For example, a reset button, keypad, or the like, may be located at the control system location, wherein the maintenance personnel must close the hatch and then move to the reset device to release the first control lockout.

As understood in the art, the type of rotor lock is a function of the wind turbine configuration. For example, the rotor lock may be one of a high speed shaft rotor lock or a low speed shaft rotor lock. Similarly, the rotor brake may be one of a high speed shaft brake or a low speed shaft brake.

The method may further include monitoring a yaw area access hatch having a third monitoring device or switch configured therewith, wherein when the yaw area access hatch is detected as opened, the method detects if a yaw lock has been engaged. If the yaw lock has not been engaged, a yaw brake is triggered to stop any further yaw rotational movement and a second control lockout is actuated between the third switch and the yaw brake. This second control lockout prevents release of the yaw brake until the third switch indicates that the yaw hatch has been closed and the second control lockout has been reset.

The present invention also encompasses a method intended to prevent opening a hatch until it is assured that the rotor has been locked and there is no rotor movement. In this regard, a method is provided for protecting personnel working in a wind turbine nacelle or hub, the method including monitoring a plurality of hatches in a wind turbine nacelle for personal or material ingress and egress, each of the hatches having a monitoring device and remotely actuated locking device configured therewith. For example, the locking device may be an electrical, electromechanical, or pneumatic locking device. If any of the hatches are indicated as closed and a rotor lock has not been engaged or rotor movement is detected, the method includes actuating a control lockout between the remotely actuated locking device configured with the closed hatch and the rotor lock. The control lockout actuates the remotely actuated locking devices and prevents opening of the closed hatch until it is detected that the rotor lock has been engaged and the rotor is not moving, and the control lockout is reset. The control lockout may need to be manually reset at a location within the nacelle.

In this embodiment, the monitored hatches may include a nacelle roof hatch, a hub access hatch within the nacelle, and a yaw area access hatch.

The present invention also encompasses a wind turbine configured with the control lockout functionalities discussed above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
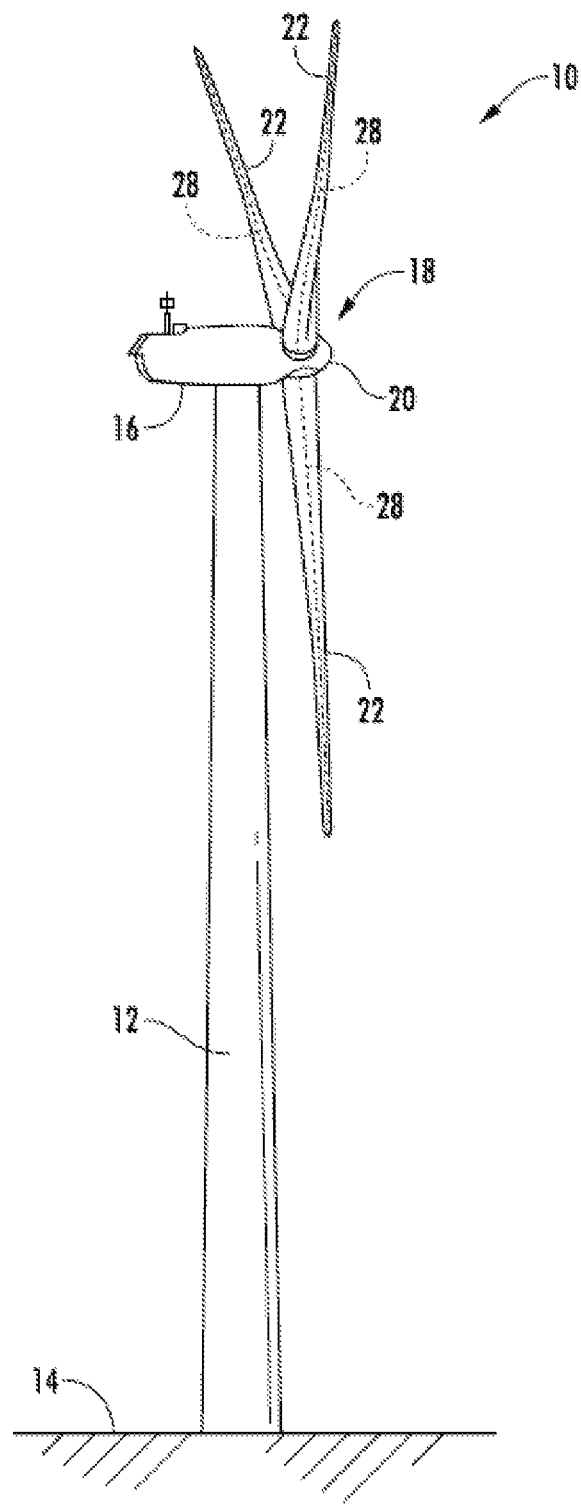
FIG. 1 is a perspective view of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a horizontal axis wind turbine 10 for placing the present invention in its operating environment. It should be appreciated that the wind turbine 10 may also be a vertical-axis wind turbine. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or main controller 26 centralized within the nacelle 16. In general, the main controller 26 may comprise a computer or other suitable processing unit. Thus, in several embodiments, the main controller 26 may include suitable computer-readable instructions that, when implemented, configure the controller 26 to perform various different functions, such as receiving, transmitting and/or executing wind turbine control signals (e.g., pitch commands). As such, the main controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 as well as the loads acting on the rotor blade 22. For example, the main controller 26 may individually control the pitch angle of each rotor blade 22 by transmitting suitable pitch commands to a pitch system 30 (FIG. 2) of the rotor blade 22. During operation of the wind turbine 10, the controller 26 may generally transmit pitch commands to each pitch system 30 in order to alter the pitch angle of each rotor blade 22 between 0 degrees (i.e., a power position of the rotor blade 22) and 90 degrees (i.e., a feathered position of the rotor blade 22).

Figure 2:
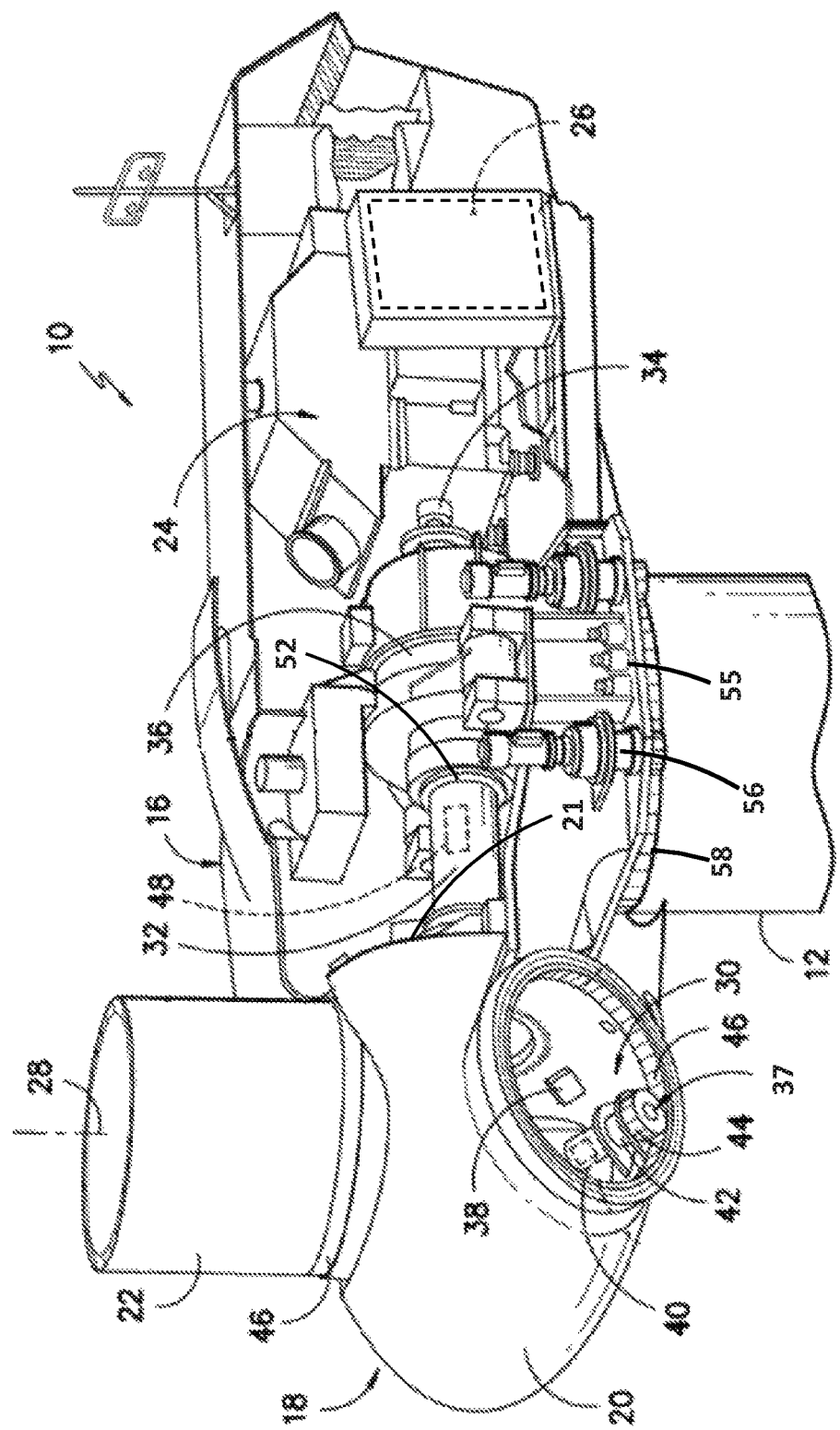
FIG. 2 is an enlarged sectional view of a portion of the wind turbine of FIG. 1.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 via a drive train for producing electrical power from the rotational energy generated by the rotor 18. For example, as shown in the illustrated embodiment, the rotor 18 may include a rotor shaft 32 (low speed shaft) coupled to the hub 20 for rotation therewith. The rotor shaft 32 may, in turn, be rotatably coupled to a generator shaft 34 (high speed shaft) of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

As shown in FIG. 2, each pitch system 30 may include a pitch adjustment mechanism 37 and a pitch controller 38 communicably coupled to the pitch adjustment mechanism 36. In general, each pitch adjustment mechanism 37 may include any suitable components and may have any suitable configuration that allows the pitch adjustment mechanism 37 to function as described herein. For example, in several embodiments, each pitch adjustment mechanism 37 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

The operation of the pitch adjustment mechanism 37 for each rotor blade 22 may generally be controlled by the main controller 26 via the individual pitch controller 38 for that rotor blade 22.

Similarly, the wind turbine 10 may include one or more yaw drive mechanisms 56 communicatively coupled to the controller 26, with each yaw drive mechanism(s) 56 being configured to change the angle of the nacelle 16 relative to the wind (e.g., by engaging a yaw bearing 58 of the wind turbine 10). The yaw system may include a yaw brake 55, such as a conventional piston/cylinder brake system, as well as a yaw lock (not depicted in FIG. 2).

Referring still to FIG. 2, the wind turbine 10 may also include a plurality of sensors 48 (one depicted in FIG. 2) for monitoring one or more operating conditions of the wind turbine 10 for purposes of the present method and system. As used herein, an operating condition of the wind turbine 10 is "monitored" when a sensor 48 is used to determine its present value. Thus, the term "monitor" and variations thereof are used to indicate that the sensors 48 need not provide a direct measurement of the operating condition being monitored. For example, one or more sensors 48 (such as an optical encoder) may be operatively configured at a suitable location along the drive train to directly or indirectly measure the rotational speed of the generator rotor. For example, the rotor speed may be derived with a sensor 48 that measures the rotational speed of the rotor hub 20, low speed shaft 32, generator shaft 34, and so forth.

Referring to FIG. 2, a braking system is operatively configured along the generator drive train and includes a brake 52 controlled by a brake controller (not depicted). Although not limited to a particular construction, the brake 52 in one embodiment may be a disc and caliper arrangement, such as a hydraulically actuated disc and caliper brake, that is sufficient to bring the rotor to a full stop and hold the rotor at a fault condition, for example an overspeed fault. In certain embodiments, the brake 52 may be operatively configured on the low speed shaft 32, the high speed shaft 34, or on the generator 24. Reference may be made to U.S. Pat. No. 6,265,785 for a more detailed description of a suitable hydraulic braking system that may be used in embodiments of the present invention. As mentioned above, the brake may be any suitable device or system that applies a braking torque to the rotor at any location along the generator drive train.

FIG. 2 also depicts a rotor lock 21 that serves to prevent rotation of the drivetrain components during repair/maintenance procedures. This lock may be configured as an assembly with a plurality of rotor lock pins that engage a rotor lock disk. Various configurations of rotor locks are known in the industry, and suitable lock may be utilized for purposes of the present invention. Reference is made to U.S. Pat. No. 8,556,591 for an exemplary rotor lock assembly. The rotor lock 21 depicted in FIG. 2 is a low speed shaft rotor lock in that it is configured on the low speed shaft 32. In alternate embodiments, the rotor lock 21 may be configured along the high speed shaft 34.

Figure 3:
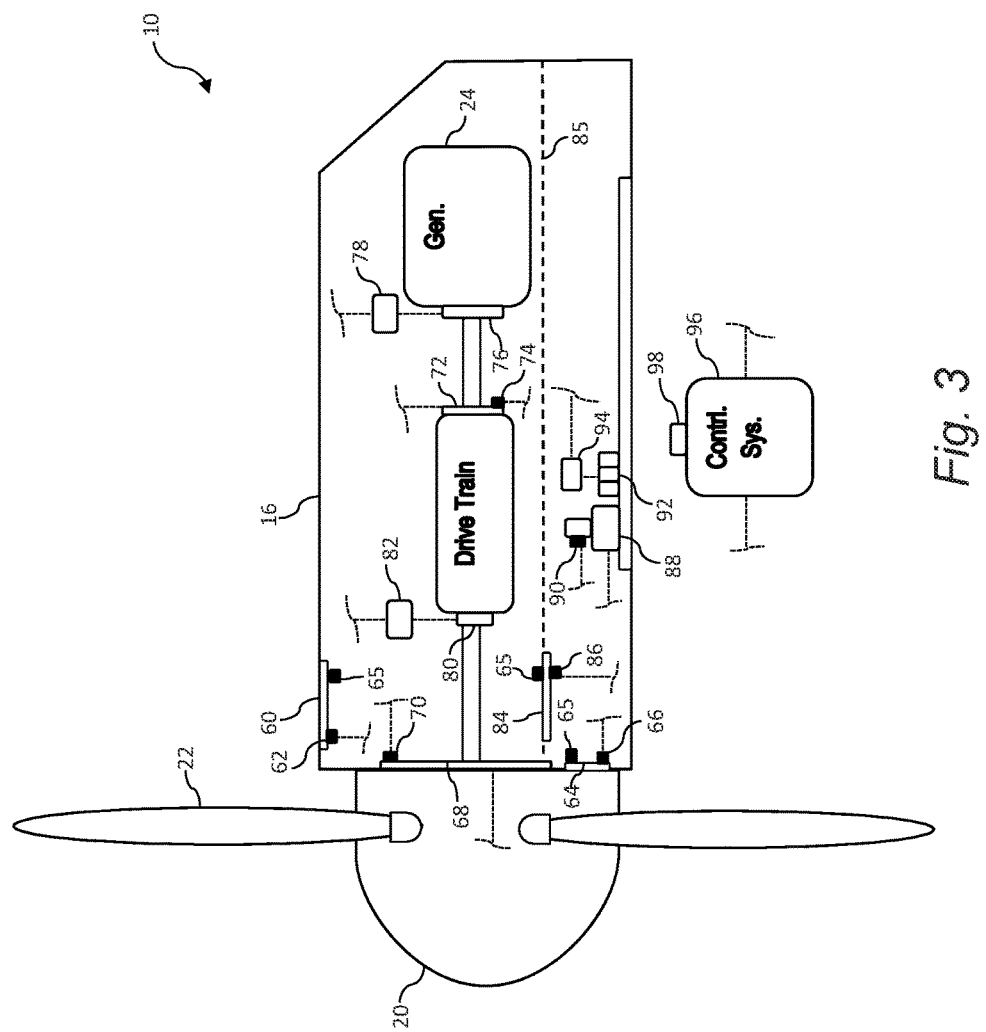
FIG. 3 is a schematic view of a portion of the wind turbine tower configured in accordance with embodiments of the systems and methods of the present invention.

FIG. 3 depicts a wind turbine 10 configured to practice the advantageous methods of the present invention. A nacelle roof hatch 60 is provided as a means for personnel to gain access to the topside of the nacelle 16 for various maintenance/repair procedures. The roof hatch 60 has an associated monitoring device (e.g. first switch) 62 configured therewith. This monitoring device 62 may be any conventional switch or sensor device that detects and generates a corresponding signal when the roof hatch 60 has been opened. The term "switch" is used herein to encompass all such monitoring devices. For example, the first switch 62 may be a mechanical or electro/mechanical contact switch, an optical sensor, or the like. The first switch 62 is in communication with a control system 96, which may be integrated with the wind turbine controller 26 (FIG. 2) or a stand-alone control system. The control system 96 is any combination of hardware and software components configured to carry out the functionalities described herein.

A rotor hub access hatch 64 provides access for personnel to enter into the rotatable hub 20 for performing any manner of maintenance/repair procedures. The location of this hatch 64 can vary depending on the design and configuration of the particular wind turbine 10, and is depicted below a bedplate 85 or other frame structure within the nacelle 16 for illustrative purposes only. The hub access hatch 64 has an associated switch (second switch) 66 configured therewith. As with the first switch 62, this switch 66 may be any conventional switch or sensor device that detects and generates a corresponding signal when the hub access hatch 64 has been opened. For example, the second switch 66 may be a mechanical or electro/mechanical contact switch, an optical sensor, or the like. The second switch 66 is in communication with the control system 96.

A yaw area access hatch 84 provides access for personnel to enter into the area within the nacelle 16 below the bedplate 85 for performing any manner of maintenance/repair procedures on the yaw components, such as the yaw drive mechanisms 56, yaw brake 92, yaw lock 88, and so forth. The yaw area access hatch 84 has an associated switch (third switch) 86 configured therewith. As with the first switch 62 and second switch 66, this third switch 86 may be any conventional switch or sensor device that detects and generates a corresponding signal when the yaw area access hatch 84 has been opened. For example, the third switch 86 may be a mechanical or electro/mechanical contact switch, an optical sensor, or the like. The third switch 86 is in communication with the control system 96.

The wind turbine 10 includes any conventional configuration of a rotor lock, rotor brake, yaw lock, and yaw brake. For illustrative purposes only, FIG. 3 depicts a low speed shaft rotor lock 68 with a switch or indicator device 70 configured therewith to communicate the engaged/disengaged state of the rotor lock 68 to the control system 96. FIG. 3 also depicts a high speed shaft rotor lock 72 with a switch or indicator device 74 configured therewith to communicate the engaged/disengaged state of the rotor lock 72 to the control system 96. It is understood that the wind turbine 10 may be configured with either or both of the rotor locks 68, 72 and associated indicator devices 70, 74.

For illustrative purposes only, FIG. 3 depicts a low speed shaft rotor brake 80 and associated brake controller 82 in communication with the control system 96, as well as a high speed shaft rotor brake 76 and associated brake controller 78 in communication with the control system 96. It is understood that the wind turbine 10 may be configured with either or both of the rotor brakes 80, 76 and associated controllers 82, 78.

For illustrative purposes only, FIG. 3 depicts a yaw lock 88 with associated switch or indicator device 90 in communication with the control system 96, as well as a yaw brake 92 and associated brake controller 94 in communication with the control system 96.

FIG. 3 also depicts a remotely actuated locking device 65 configured with each of the nacelle roof hatch 60, hub access hatch 64, and yaw access hatch 84. These locking devices 65 are in communication with the control system 96 and can be automatically and remotely actuated by the control system 96. The locking devices may be any manner of conventional electrical, electro-mechanical, or pneumatic type of locking device.

With reference to FIG. 3, various present method embodiments are explained. The method for protecting personnel working in a wind turbine nacelle 16 or hub 20 includes monitoring the nacelle roof hatch 60 and the hub access hatch 64 within the nacelle 16. As discussed, the roof hatch 60 has the first switch 62 configured therewith and the hub access hatch 64 has the second switch 66 configured therewith. When at least one of the hatches 60, 64 is detected as opened, the method includes detecting if the rotor lock 68 and/or 72 has been engaged. If the rotor lock(s) 68, 72 have not been engaged, then the rotor brake 80 and/or 76 is triggered to stop any further rotor and drivetrain component rotational movement.

The method includes actuating a first control lockout between the first 62 or second 66 switch configured with the respective open hatch 60, 64 and the rotor brake 80, 76. This first control lockout prevents release of the rotor brake 80, 76 until the first or second switch 62, 66 associated with the open hatch indicates 60, 64 that the hatch has been closed and the first control lockout has been reset. The lockout functionality may include a logic condition in the brake control circuitry that requires a signal indicating that the hatch is closed and the lockout reset 98 has been actuated before the brake can be released.

The first control lockout functionality may be actuated by the control system 96 that is in communication with the switches 62, 66, as well as the rotor lock sensor (or suitable indicator) 70, 74 that detects whether the rotor lock is engaged. The control system 96 is also in communication with the rotor brake controller(s) 82, 78 to actuate the control lockout, as well as a reset functionality device 98.

In certain embodiments, the first and second switches 62, 66 are monitored to detect when its respective associated hatch 60, 64 has been opened. For example, the switches 62, 66 may be mechanical or mechanical/electrical contact switches, optical sensors, or the like, configured on the hatches 60, 64. Thus, it should be understood that the term "switch" is used herein to encompass a device or mechanism that detects whether the hatch is opened or closed and generates a corresponding signal to the lockout control system 96.

In a particular embodiment, the method requires that the first control lockout be manually reset at a location within the nacelle 16 that may be remote from the hatch 60, 64. For example, a reset button, keypad, or the like device 98 may be located at the control system 96 location, which requires the maintenance personnel to close the hatch 60, 64 and then move to the remote reset device 98 to release the first control lockout.

The method may further include monitoring the yaw area access hatch 84 having the third switch 86 configured therewith. As with the other hatch scenarios, wherein when the yaw area access hatch 84 is detected as opened, the method detects if the yaw lock 88 has been engaged via the sensor 90. If the yaw lock 88 has not been engaged, the yaw brake 92 is triggered by the control system 96 via the brake controller 94 to stop any further yaw rotational movement and a second control lockout is actuated between the third switch 86 and the yaw brake 92. This second control lockout prevents release of the yaw brake 92 until the third switch 86 indicates that the yaw hatch 84 has been closed and the second control lockout has been reset.

As discussed above, the present invention also encompasses a method intended to prevent opening a hatch in a wind turbine nacelle until it is assured that the rotor has been locked and there is no rotor movement. In this regard, a method is provided for protecting personnel working in a wind turbine nacelle 16 or hub 20, the method including monitoring a plurality of hatches 60, 64 in a wind turbine nacelle for personal or material ingress and egress, each of the hatches 60, 64 having a monitoring device or switch 62, 66 and remotely actuated locking device 65 configured therewith. If any of the hatches 60, 64 are indicated as closed and the rotor lock 68, 72 has not been engaged or rotor movement is detected, the method includes actuating a control lockout between the remotely actuated locking device 65 configured with the closed hatch 60, 64 and the rotor lock 68, 72. The control lockout actuates the remotely actuated locking devices 65 and prevents opening of the closed hatch 60, 64 until it is detected that the rotor lock 68, 72 has been engaged and the rotor 18 is not moving, and the control lockout is reset. The control lockout may need to be manually reset at a location within the nacelle 16. In this embodiment, the monitored hatches may include any combination of the nacelle roof hatch 60, hub access hatch 64, and the yaw area access hatch 84.

The present invention also encompasses a wind turbine configured with the control lockout functionalities discussed above. The relevant structural aspects of the wind turbine are described in detail above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for protecting personnel working in a wind turbine nacelle or hub, comprising:

monitoring a plurality of hatches in a wind turbine nacelle for personal or material ingress and egress, each of the hatches having a monitoring device configured therewith;

when at least one of the hatches is detected as opened, detecting if a rotor lock has been engaged;

if the rotor lock has not been engaged or the rotor is moving, then triggering a rotor brake to stop the rotor and drivetrain component rotational movement and actuating a first control lockout between the monitoring device configured with the open hatch and the rotor brake, wherein the first control lockout prevents release of the rotor brake until the monitoring device indicates that the open hatch has been closed and the first control lockout has been reset;

monitoring a yaw area access hatch having a third switch configured therewith;

when the yaw area access hatch is detected as opened, detecting if a yaw lock has been engaged;

if the yaw lock has not been engaged, then triggering a yaw brake to stop yaw rotational movement and actuating a second control lockout between the third switch and the yaw brake; and wherein the second control lockout prevents release of the yaw brake until the third switch indicates that the yaw hatch has been closed and the second control lockout has been reset.

2. The method of claim 1, wherein the monitoring devices are switches that detect an open or closed state of the hatches.

3. The method of claim 1, wherein the rotor lock is one of a high speed shaft rotor lock or a low speed shaft rotor lock.

4. The method of claim 1, wherein the rotor brake is one of a high speed shaft brake or a low speed shaft brake.

5. The method of claim 1, wherein the monitored hatches include a nacelle roof hatch and a hub access hatch within the nacelle, the roof hatch having a first switch configured therewith and the hub access hatch having a second switch configured therewith as the monitoring devices.

6. The method of claim 1, wherein the third switch is monitored to detect when the yaw area access hatch has been opened.

7. The method of claim 1, wherein the second control lockout is manually reset at a location within the nacelle.

8. The method of claim 1, comprising:

closing the hatch;

providing a remote reset device of a control system location at a location away from the hatch within the nacelle; and actuating the remote reset device to reset the first control lockout.

9. A method for protecting personnel working in a wind turbine nacelle or hub, comprising:

monitoring a plurality of hatches in a wind turbine nacelle for personal or material ingress and egress, each of the hatches having a monitoring device and remotely actuated locking device configured therewith;

if at least one of the hatches is detected as closed and a rotor lock has not been engaged or rotor movement is detected, actuating a first control lockout between the remotely actuated locking devices configured with the hatches and the rotor lock;

wherein the first control lockout actuates the remotely actuated locking device associated with the closed hatch and prevents opening of the closed hatch until it is detected that the rotor lock has been engaged and the rotor is not moving, and the first control lockout is reset;

monitoring a yaw area access hatch having a switch configured therewith;

when the yaw area access hatch is detected as opened, detecting if a yaw lock has been engaged;

if the yaw lock has not been engaged, then triggering a yaw brake to stop yaw rotational movement and actuating a second control lockout between the switch and the yaw brake; and wherein the second control lockout prevents release of the yaw brake until the switch indicates that the yaw hatch has been closed and the second control lockout has been reset.

10. The method of claim 9, wherein the control lockout is manually reset at a location within the nacelle.

11. The method of claim 9, wherein the monitored hatches include a nacelle roof hatch, a hub access hatch within the nacelle, and a yaw area access hatch.

\* \* \* \* \*